US011396922B2

(12) United States Patent
Abdolahian et al.

(10) Patent No.: US 11,396,922 B2
(45) Date of Patent: Jul. 26, 2022

(54) COMPOSITE GEOMETRY STRUCTURE FOR THE ABSORPTION AND DISSIPATION OF THE ENERGY GENERATED BY AN IMPACT AND A SAFETY HELMET COMPRISING SAID STRUCTURE

(71) Applicants: AIRHELMET S.R.L., Bolzano (IT); Patrick Pedevilla, Bolzano (IT)

(72) Inventors: Alessio Abdolahian, Treviso (IT); Giovanni Crosera, San Dona' di Piave (IT)

(73) Assignees: Airhelmet S. R. L., Bolzano (IT); Patrick Pedevilla, Bolzano (IT)

( * ) Notice: Subject to any disclaimer, the term of this patent is extended or adjusted under 35 U.S.C. 154(b) by 757 days.

(21) Appl. No.: 15/758,665

(22) PCT Filed: Sep. 16, 2016

(86) PCT No.: PCT/IB2016/055534
§ 371 (c)(1),
(2) Date: Mar. 8, 2018

(87) PCT Pub. No.: WO2017/046757
PCT Pub. Date: Mar. 23, 2017

(65) Prior Publication Data
US 2018/0252286 A1 Sep. 6, 2018

(30) Foreign Application Priority Data
Sep. 18, 2015 (IT) .......................... 102015000052896

(51) Int. Cl.
*F16F 3/087* (2006.01)
*A42B 3/06* (2006.01)
(Continued)

(52) U.S. Cl.
CPC ............ *F16F 3/0876* (2013.01); *A42B 3/064* (2013.01); *A42B 3/065* (2013.01); *A42B 3/066* (2013.01);
(Continued)

(58) Field of Classification Search
CPC .... F16F 3/0876; F16F 7/122; F16F 2224/025; A42B 3/064; A42B 3/065; A42B 3/066; A42B 3/124; A42B 3/08
See application file for complete search history.

(56) References Cited

U.S. PATENT DOCUMENTS 3,169,251 A * 2/1965 Humes, Jr. ............. A42B 1/201
2/171.03
RE29,452 E * 10/1977 Townsend, Jr. .......... A42C 5/04
2/209.7
(Continued)

FOREIGN PATENT DOCUMENTS

| DE | 1 944 293 A | 4/1971 |
| EP | 1 640 147 A1 | 3/2006 |
| FR | 2 542 668 A | 3/1983 |

OTHER PUBLICATIONS

International Search Report and Written Opinion dated Dec. 13, 2016, issued in PCT Application No. PCT/IB2016/055534, filed Sep. 16, 2016.

*Primary Examiner* — Xuan Lan Nguyen
(74) *Attorney, Agent, or Firm* — Workman Nydegger

(57) ABSTRACT

A composite geometry structure for the absorption and dissipation of the energy generated by an impact includes a plurality of hollow cells, adjacent and stably connected to each other. On each cell there are identified one or more arc elements which develop starting from two juxtaposed areas of the same perimeter edge of the cell, such arc elements being configured to be elastically deformed.

18 Claims, 6 Drawing Sheets

(51) Int. Cl.
*A42B 3/12* (2006.01)
*F16F 7/12* (2006.01)
*A42B 3/08* (2006.01)

(52) U.S. Cl.
CPC .............. *A42B 3/124* (2013.01); *F16F 7/122* (2013.01); *A42B 3/08* (2013.01); *F16F 2224/025* (2013.01)

(56) References Cited

U.S. PATENT DOCUMENTS

| | | | | |
|---|---|---|---|---|
| 4,370,754 | A * | 2/1983 | Donzis | A41D 13/0153 |
| | | | | 2/16 |
| 5,840,397 | A * | 11/1998 | Landi | A41D 31/285 |
| | | | | 428/73 |
| 9,222,535 | B2 * | 12/2015 | Bock | F16F 3/0876 |
| 9,474,313 | B2 * | 10/2016 | Kamradt | F16F 3/093 |
| 9,907,343 | B2 * | 3/2018 | Lacey | A41D 13/015 |
| 2003/0088900 | A1 * | 5/2003 | Cho | A63B 71/1225 |
| | | | | 2/22 |
| 2013/0305435 | A1 * | 11/2013 | Surabhi | A42B 3/06 |
| | | | | 2/414 |
| 2015/0033453 | A1 * | 2/2015 | Pannikottu | B32B 5/18 |
| | | | | 2/413 |
| 2016/0327113 | A1 * | 11/2016 | Shelley | G02C 5/12 |
| 2017/0298613 | A1 * | 10/2017 | Lee | E04B 1/3211 |
| 2019/0269193 | A1 * | 9/2019 | Benyola | A42B 3/044 |

* cited by examiner

COMPOSITE GEOMETRY STRUCTURE FOR THE ABSORPTION AND DISSIPATION OF THE ENERGY GENERATED BY AN IMPACT AND A SAFETY HELMET COMPRISING SAID STRUCTURE

BACKGROUND OF THE INVENTION

1. The Field of the Invention

The present invention regards a composite geometry structure for the absorption and dissipation of the energy generated by an impact, particularly but not exclusively indicated for the protection of the human body.

The present invention also regards a safety helmet comprising the aforementioned composite geometry structure.

2. The Relevant Technology

Various types of structures used for protecting the human body against impact are known. In particular, as regards protecting the head, the helmets used are generally made up of three elements:

an outer rigid cap which is subjected to the impact;
an inner layer, usually made of polystyrene, housed in the aforementioned cap and which serves to dissipate the energy generated following the impact;
a housing for the user's head, made of soft material.

Cyclists, in particular those riding in urban traffic, skaters, roller-bladers, skateboarders need helmets capable of mainly serving two purposes:

efficiently absorbing and dissipating the energy generated following an impact;
occupying little space, so that they can be easily put away in a rack sack or bag when not being used.

With the aim of saving space, there were provided caps comprising a plurality of components which are assembled subsequently through fixing means such as joints or hinges.

Though, on the one hand, this solution enables overcoming the problem of saving space, on the other hand it no longer provides a cap capable of efficiently performing its function of protecting the user's head in case of impact, in that the cap is formed by several parts which do not directly collaborate with each other and thus could separate in case of impact.

Mr. Alessio Abdolahian, proprietor of the patent application no. PD2012A335, attempted to overcome this drawback by providing a foldable safety helmet comprising an outer cap having a honeycomb structure with irregular hexagons connected to each other to form a single body.

According to this solution, the cap has a honeycomb structure with irregular hexagons made using elastomers, preferably thermoplastic polyurethane, even more preferably made of TPU-92A, a polyurethane-based material obtained through 3D or conventional printing techniques.

In this case, though the force transmission tests, carried out during the testing of the aforementioned helmet, revealed the cap's good resistance against impact, the honeycomb geometry of the helmet revealed to be insufficient at dissipating the energy generated by the impact.

SUMMARY OF THE INVENTION

The present invention has the object of overcoming the aforementioned drawbacks.

In particular, an object of the present invention is to provide a structure for the absorption and dissipation of the energy generated by an impact, made in a single piece, elastically deformable upon impact and configured so as to dissipate the energy of the impact without transmitting it to the protected parts of the body or, more generally, the object protected by the structure.

A further object of the present invention is to provide a structure that can be used by the user in a simple and easy manner and capable of being worn comfortably by the same.

The aforementioned objects are attained by a composite geometry structure for the absorption and dissipation of the energy generated by an impact according to the claims.

The aforementioned objects are also attained by a safety helmet according to the claims.

Further detailed characteristics of the invention are outlined in the dependent claims.

Advantageously, the single body and composite geometry structure according to the invention enables dissipating the energy caused by an impact thanks to the presence of elastically deformable arc elements which develop starting from the juxtaposed areas of a plurality of geometric elements with three-dimensional development and hollow, mutually adjacent and connected to each other. This occurs without the energy of the impact being transmitted to the body of the user or to the object protected by such structure.

Actually, the energy caused by the impact is absorbed due to the deformation of the arc elements underlying and connecting the hollow geometric elements.

Still advantageously, the single body and composite geometry structure according to the invention improves the comfort of the person using it due to the presence of the aforementioned elastic arc elements, but serving the same purpose as a foam rubber.

Still advantageously, being made of an elastic material, the composite geometry structure according to the invention can be easily folded so as to obtain an internally hollow oval shape, which enables containing accessories such as gloves, a cap and the like therein.

Basically, the composite geometry structure according to the invention serves as a space-saving container for objects once it is no more used as a protection.

BRIEF DESCRIPTION OF THE DRAWINGS

The aforementioned objects and advantages will be more apparent from the description of a preferred embodiment of the invention provided by way of non-limiting example, with reference to the attached drawings, wherein.

DETAILED DESCRIPTION OF THE PREFERRED EMBODIMENTS

Figure 1:
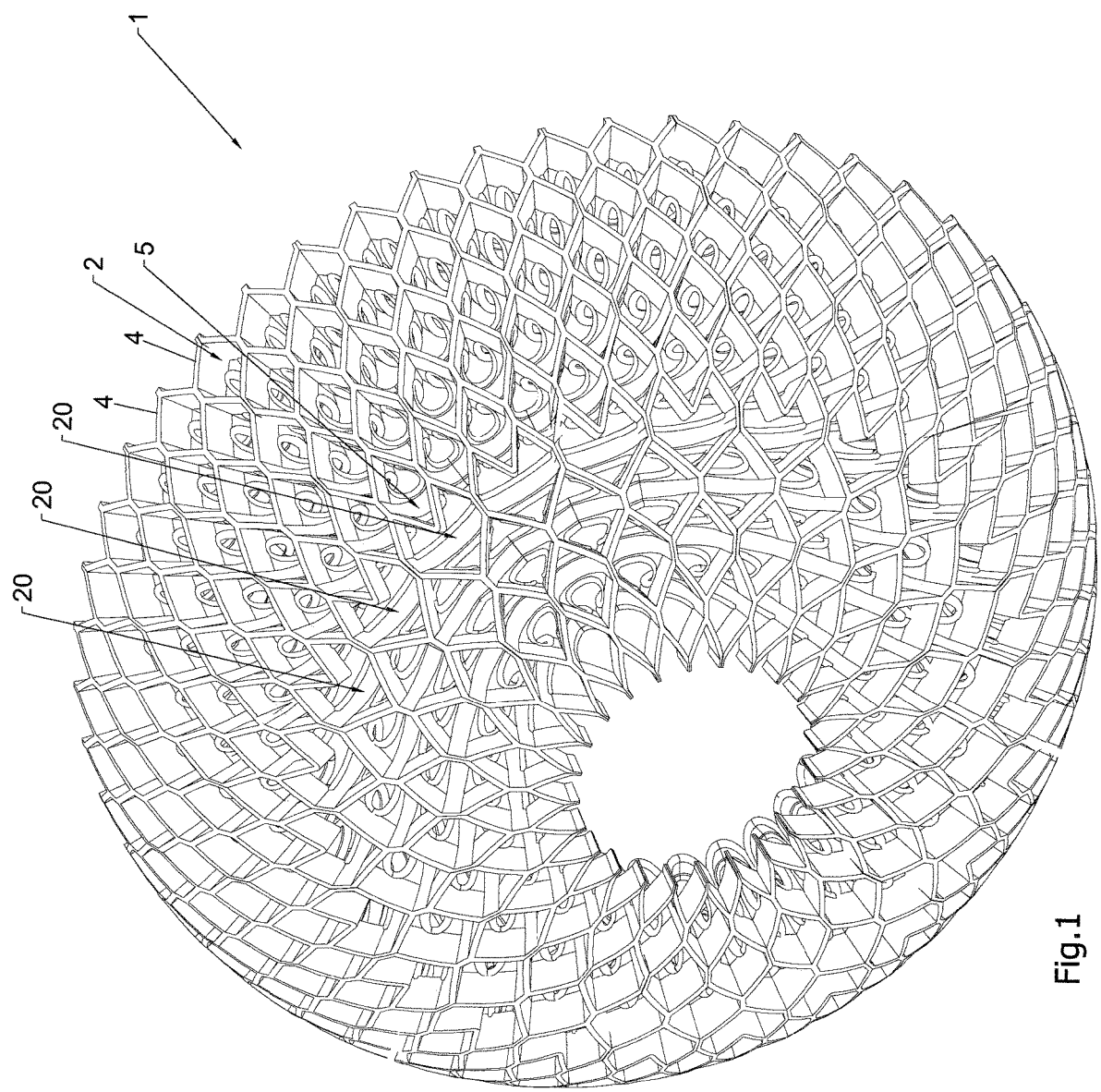
FIGS. 1 and 2 represent two different axonometric views of the composite structure for the absorption and dissipation of the energy of an impact according to the invention.

With reference to FIG. 1, there is shown a composite geometry structure for the absorption and dissipation of the energy generated by an impact, indicated in its entirety with 1, comprising a plurality of adjacent and mutually interconnected hollow cells 2.

In the embodiment represented in FIG. 1, the cells 2 are mainly hexagonal-shaped. FIG. 1 also shows the presence of some cells 20 octagonal-shaped.

However, according to a variant embodiment (not represented), the cells could also have a different shape, for example a polygonal shape different from the hexagonal or even circular shape. There could also be provided for cells all having the same geometric shape or cells having geometric shapes different from each other.

Figure 2:
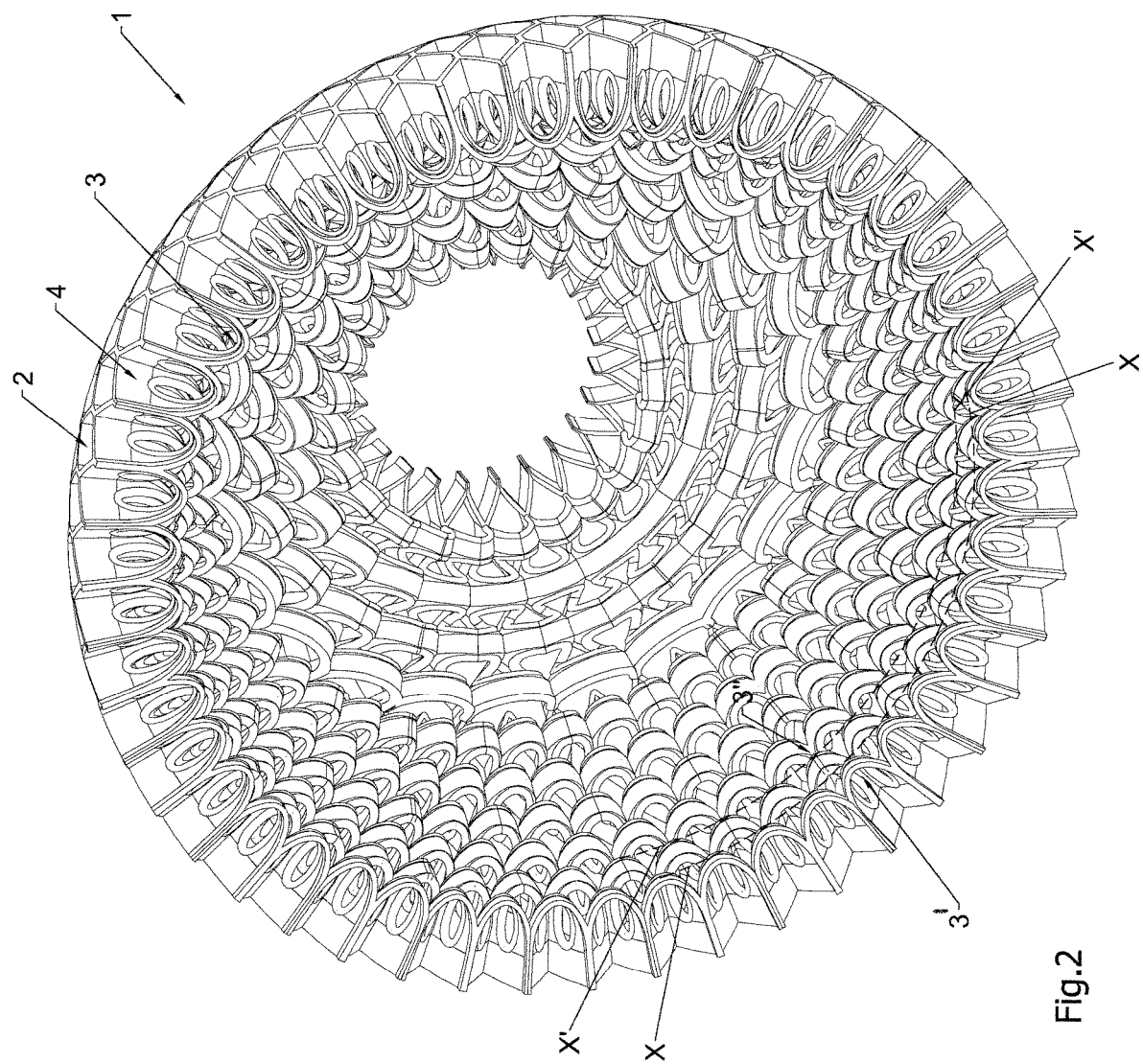

With reference to FIG. 1 and according to the present invention, each cell 2 has a polyhedric structure from which a plurality of arc elements 3 spaced from each other, visible in FIG. 2, depart.

Figure 3:
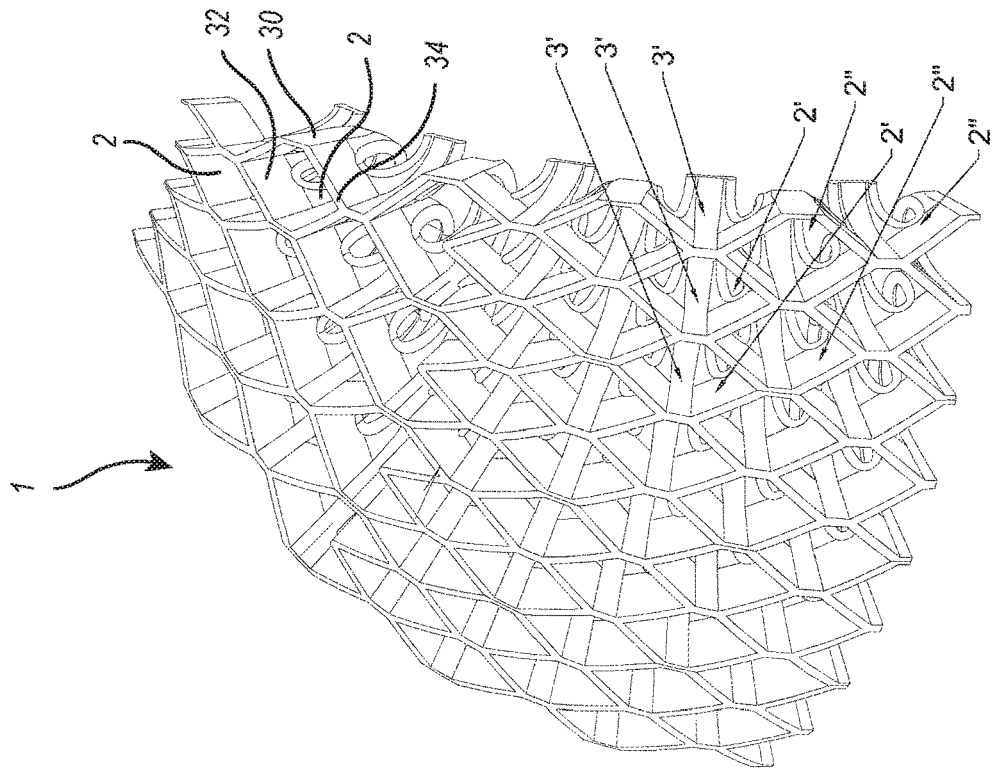

In particular, observing FIGS. 2 and 3, each of the aforementioned arc elements 3 develops staring from the same perimeter edge 4 of each cell 2.

Figure 4:
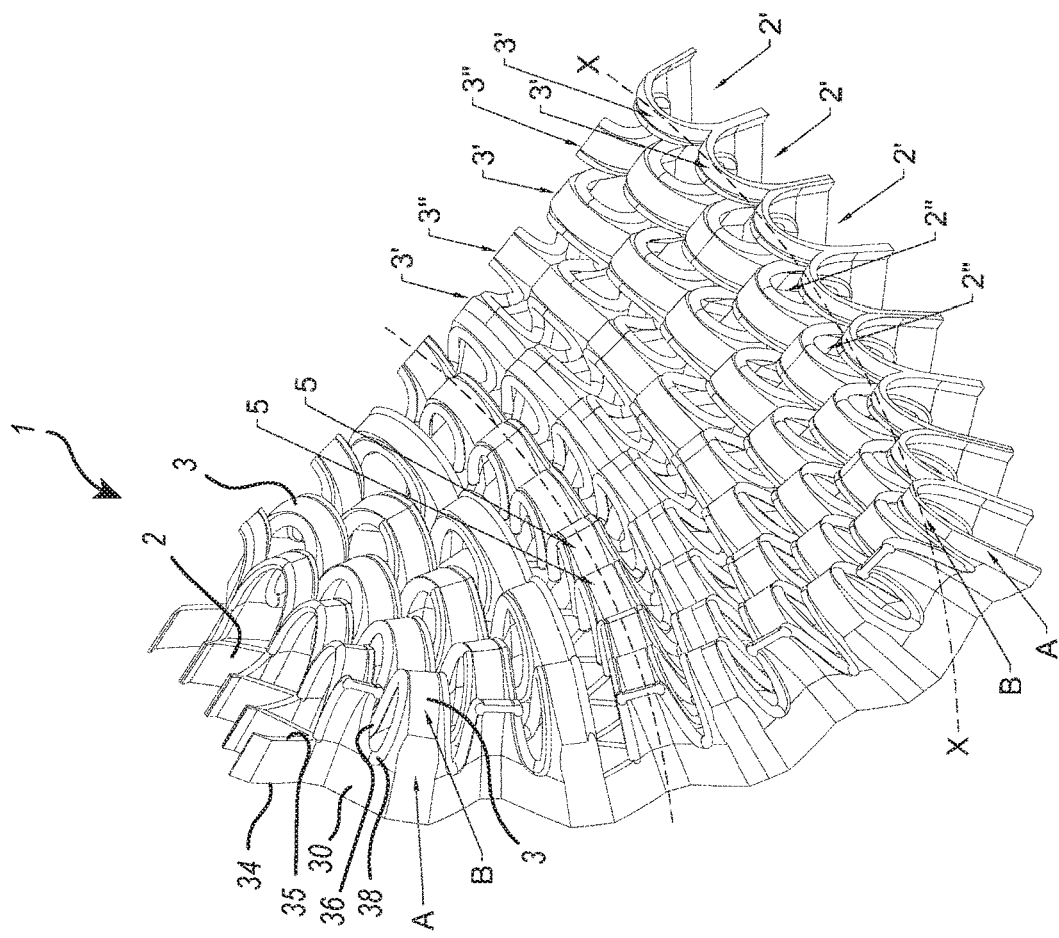
FIGS. 3 and 4 represent two different views of a detail of the structure of FIG. 1.

More specifically, with reference to FIGS. 3 and 4, composite geometry structure 1 includes an outer structure 30 having a plurality of hollow cells 2 passing therethrough. Outer structure 30 is comprised of a plurality of sidewalls 32 that are interconnected. Each of the plurality of sidewalls 32 encircle a corresponding one of the plurality of hollow cells 2 and extend between an outside perimeter edge 34 and an inside perimeter edge 35. A plurality of arc elements 3 project from outer structure 30. Each of the plurality of arc elements 30 have opposing ends 36, 38 projecting from spaced apart areas of the inside perimeter edge 35 of a corresponding one of the plurality of sidewalls 32 so as to span across the hollow cell 2 of the corresponding one of the plurality of sidewalls 32 in the shape of an arch.

Advantageously, each of the aforementioned arc elements 3 enables, thanks to the conformation thereof, to dissipate the energy of the impact without it being transmitted all the way to the skull of the user. This is enabled by the fact that the arc elements 3 of each cell 2 are subjected to elastic deformation upon impact and, deforming, they discharge the impact energy towards the adjacent cells.

It should be observed that the structure 1 has—at the upper part—a rigid honeycomb structure, similar to a honeycomb, indeed.

Advantageously, the upper part of the composite geometry structure 1 is sufficiently rigid so as to absorb the impact energy without damaging the structure 1.

Basically, advantageously and with reference to FIG. 4, the composite geometry structure 1 is configured so that a first substantially rigid area A and a second area B made of a more elastic material are identified therein.

The first area A enables absorbing the impact energy, while the second area B contributes to dissipating the energy of the impact not only on the single cell 2, but also transmitting the energy on the adjacent cells through the elastic deformation of the arc elements 3.

In this manner, the dissipation of the impact energy is considerably increased and thus allowing preventing the energy in question from being transmitted to the skull of the person.

In particular, and with reference to FIGS. 3 and 4, the energy dissipation effect occurs due to the presence of:
 a plurality of first arc elements 3' which have a geometric continuity with the arc elements of the cells 2';
 a plurality of second arc elements 3" each one of which has a geometric continuity with the arc elements of the cells 2".

Basically, in the first case, energy dissipation occurs between the arc elements 3' having the same direction of development X, visible in FIG. 4, the geometric continuity being guaranteed by the connection surfaces 5. In the second case instead, energy dissipation occurs between the arc elements 3" which have development directions different from each other (see FIG. 3).

As observable from FIG. 3, in the latter case, the surfaces which enable the dissipation of the impact energy have a substantially spiral development.

This fact advantageously leads to the energy dissipation not occurring only between the arc elements 3' of the cells 2' located at the same height according to an arrangement similar to the parallels of a sphere (for example parallel X), but also between the arc elements 3' e 3", respectively belonging to the cells 2' and the cells 2" adjacent and located at heights different from each other. This means that energy dissipation also occurs between the cells that develop according to different parallel lines (comparing the structure 1 with a part of a sphere).

The fact that energy dissipation also occurs between different parallel lines multiplies the impact energy dissipation effect.

In addition, as observable in FIG. 2, the arc elements 3" are arranged staggered along a parallel line X' different from the parallel line X along which the arc elements 3' are arranged. This characteristic advantageously leads to having a much larger impact energy dissipation total surface area.

It should be observed that the composite geometry structure according to the invention may also be applied for protecting other parts of the human body such as, for example, the back, knees, arms, etc.

It should also be advantageously observed that the composite geometry structure according to the invention can also be used for protection against impacts that, generally, affect objects, such as for example a computer monitor.

Now back to the use of the structure 1 in the cycling, skating and skateboarding fields, the structure 1 may be part of a safety helmet 10 (visible, in its entirety, in FIG. 8) and be housed in the cap 11 of the helmet 10.

Figure 5:
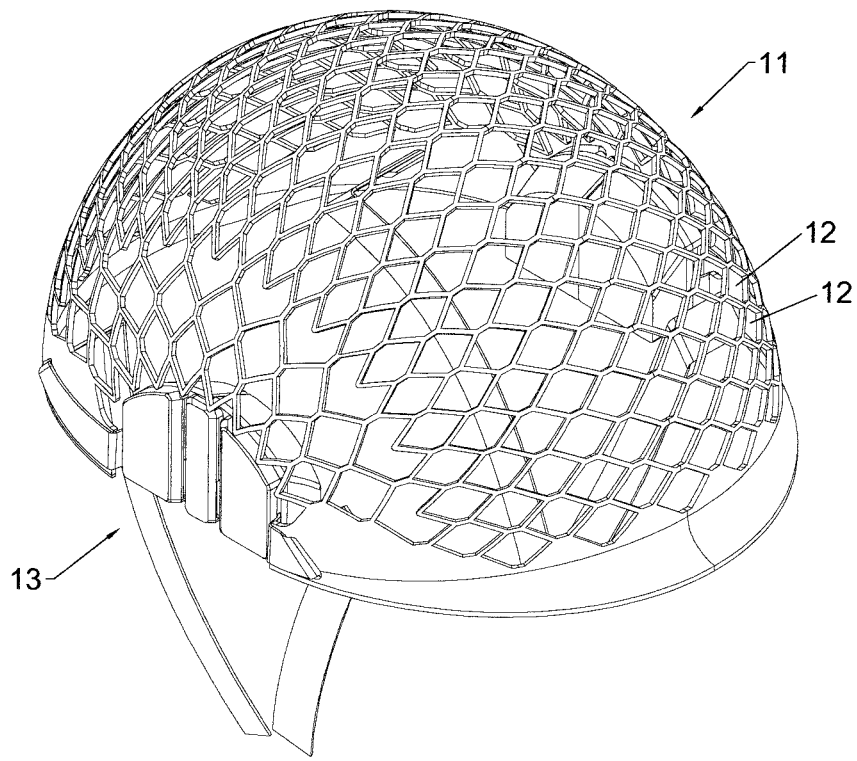
FIGS. 5 and 6 represent two different axonometric views of the cap belonging to the safety helmet according to the invention.
Figure 6:
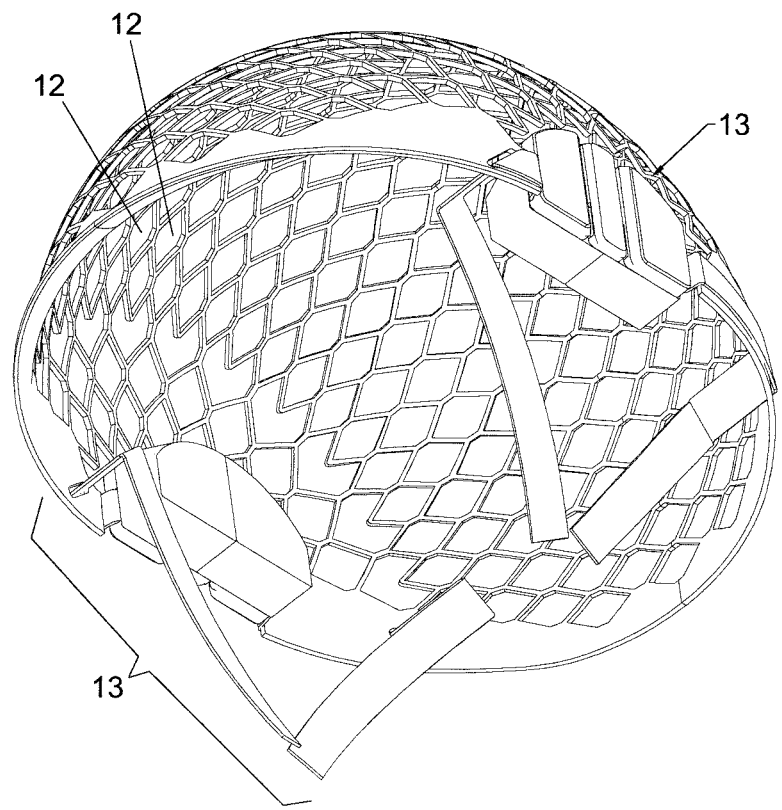
Figure 8:
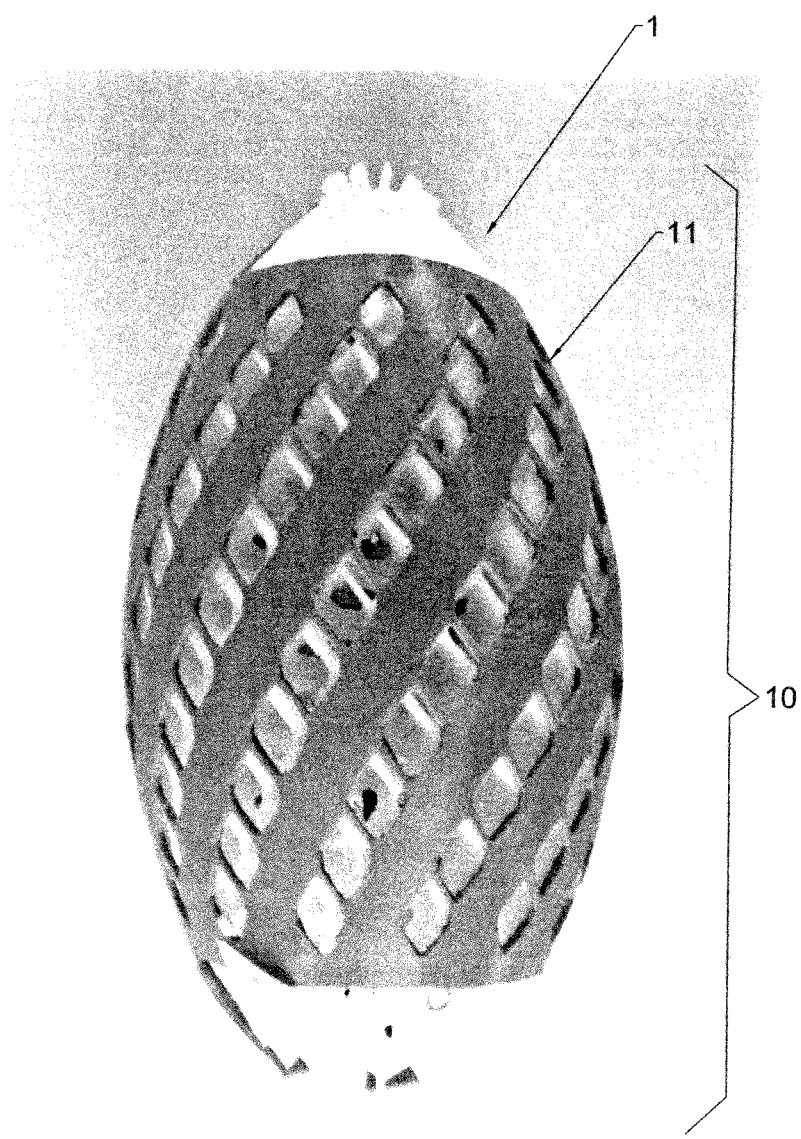
FIG. 8 represents a front view of the helmet according to the invention in a folded configuration.

In this case, as observable in FIGS. 5, 6 and 8, the cap 11 of the helmet 10 is provided with a plurality of openings 12.

Advantageously, the openings 12 enable good ventilation of the safety helmet 10.

The cap 11 receives the composite structure 1 therein so that, at each of the openings 12, there also projects a cell 2 of the composite structure 1.

FIGS. 5 and 6 show that the helmet laterally has two closing units 13.

Figure 7:
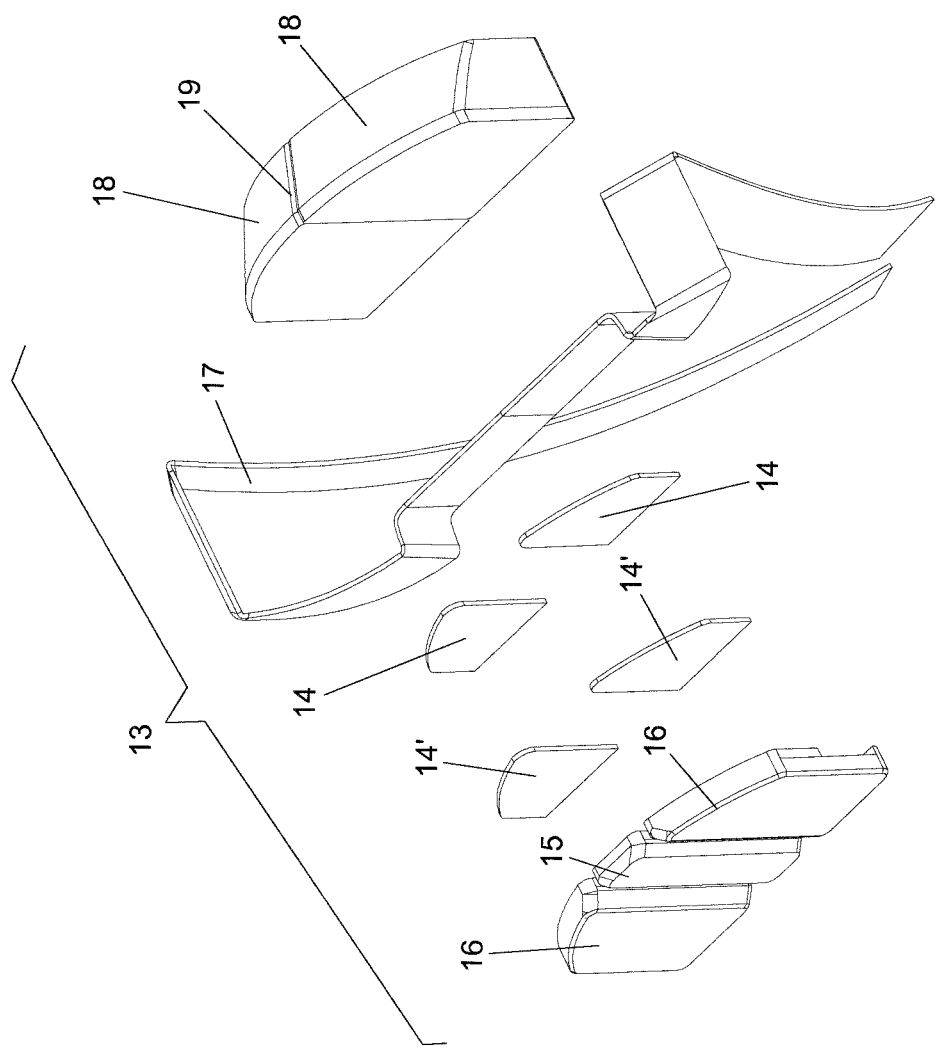
FIG. 7 represents the exploded view of the detail of the lateral closing unit of the cap of FIG. 5.

As observable in particular in FIG. 7, each lateral closing unit 13 comprises:
 two elements 18 made of expanded poron, which advantageously serve to absorb the impact energy;
 four Velcro elements 14, 14' which are mutually coupled two by two according to a male-female coupling ("Velcro" elements are herein generically referred to as "hook and loop" elements);
 three elements, of which the central element 15 is fixed, while the two lateral elements 16 are mobile.

FIG. 7 also shows a strip 17 serving to hold the entire closing unit 13 together and it is suitable to be fixed to a strap (not visible in the figures), which slides under the chin of the user so as to hold the helmet secured to the head thereof.

Each closing unit 13 operates as follows.

When the user has finished to use his helmet and wants to put it inside his rack sack or bag, he folds it.

When folding, the elements made of poron 18 are folded to form a V-shape until they are superimposed with respect to each other.

Given that the poron elements 18 are integral with the Velcro elements 14, when the first ones are folded they cause also the latter to be folded to form a V-shape.

Given that the Velcro elements 14 are coupled to the Velcro elements 14', when the first ones are folded they cause also the latter to be folded to form a V-shape.

Lastly, given that the Velcro elements 14' are integral to the lateral elements 16, the latter are also folded to form a V-shape, while the central element 15 remains fixed.

Advantageously, the central element 15 serves two purposes:
  covering the folding line, represented by the separation line 19 between the two poron elements 18;
  forming the part through which the aforementioned under-chin strap slides.

The folding of the two closing units 13 advantageously enables the folding of the cap 11. Likewise, also the composite structure 1 contained in the cap 11 can fold due to the elastic deformation property of its arc elements 3.

Folding both the cap 11 and the composite geometry structure 1 contained therein allows obtaining an oval-shaped configuration, substantially similar to a rugby ball, visible in FIG. 8.

Obviously, variant embodiments (not represented) of the closing unit of the helmet according to the invention, for example providing for a closing unit in three points similar to the one used for children safety belts in vehicles, may be provided.

It should be observed that the outer cap 11 illustrated in the figures has a shape that follows the profile of the composite geometry structure 1; however, according to a variant embodiment not illustrated in the figures, the outer cap 11 could be differently shaped not following the profile of the structure 1. For example, the outer cap could be conventionally shaped or, generally, it could be of any shape having a foldable geometry.

The folding of the composite geometry structure according to the invention is enabled by the elastic material it is made up of, generally expanded polyurethane, in particular TPU.

In particular, the conformation of the arc elements that transform elastically enables this type of folding up to obtaining an internally hollow oval shape.

Advantageously, the hollow oval-shaped configuration enables the user to use the helmet thus folded as a container for objects, for example eyeglasses, gloves, etc. and put it away in a rack sack or a bag.

Lastly, the oval-shaped structure thus obtained may be closed using an appropriate strip or similar means.

Advantageously, the cap of the helmet may be easily detached from the helmet by means of a simple de-coupling device, for example a pressure button or similar means, thus becoming an interchangeable element, as the user prefers.

The cap is generally made of plastic material, ABS or any similar material.

Such process, of the per se known type, uses special stereolithography machines, which create the model of the composite structure through moulding by depositing layers of a special resin.

In the light of the above, the composite geometry structure and the safety helmet according to the invention attain the pre-set objects.

In particular, the object of attaining a composite geometry structure capable of absorbing and dissipating the energy caused by an impact has been attained.

In addition, the object of attaining a structure that is easy to wear and comfortable for the user, in that the lower area with the arc elements enables a softer support of the structure in the area at contact with the head of the user, has been attained.

Advantageously, the dissipation of the impact energy is considerably boosted with respect to the prior art, in that the arc elements, which form the lower area of the composite geometry structure, enable dissipating the energy not only in one direction, but also in multiple directions.

In this manner, the energy dissipation effect is multiplied and distributed along a much larger total surface area of the composite structure according to the invention, all this without transmitting the impact energy to the skull of the user thus protecting the user against fatal accidents.

Still advantageously, the composite geometry structure according to the invention is also applicable to other parts of the human body, and it can for example be used for covering objects.

Still advantageously, the composite geometry structure and the helmet according to the invention were successfully subjected to various crash tests, and they are thus compliant with the UNI-1078 standards.

In addition, the composite geometry structure according to the invention can be used several times subsequently to an impact, thus also overcoming the drawback of the usual absorption structures made of polystyrene that can only be used once.

Furthermore, the folding of the composite geometry structure and of the helmet according to the invention, due to the elastic deformability of the arc elements, enables easy transportation thereof and considerably reduces the overall dimensions for the user after utilisation thereof.

Lastly, once used and folded, the safety helmet according to the invention can be used as a container for holding objects.

The invention claimed is:

1. A composite geometry structure for the absorption and dissipation of the energy generated by an impact comprising:
  an outer structure having a plurality of hollow cells passing therethrough, the outer structure being comprised of a plurality of sidewalls that are interconnected, each of the plurality of sidewalls encircling a corresponding one of the plurality of hollow cells and extending between an outside perimeter edge and an opposing inside perimeter edge; and
  a plurality of arc elements projecting from the outer structure, each of the plurality of arc elements having opposing ends projecting from spaced apart areas of a corresponding one of the plurality of sidewalls so as to span completely across the hollow cell of the corresponding one of the plurality of sidewalls in the shape of an arch, each of the plurality of arc elements projecting away from the hollow cell of the corresponding one of the plurality of sidewalls so that plurality of hollow cells are free of the plurality of arc elements, wherein each of the plurality of arc elements is configured to be elastically deformed and wherein each of the plurality of hollow cells is polyhedric-shaped.

2. The composite geometry structure according to claim 1, wherein each cell is polygonal-shaped in its cross-section.

3. The composite geometry structure according to claim 1, wherein each cell is hexagonal-shaped in its cross-section.

4. The composite geometry structure according to claim 1, wherein each arc element has a geometric continuity with the arc elements of the adjacent cells through connection surfaces.

5. The composite geometry structure according to claim 4, wherein each arc element further has a geometric continuity with the arc elements of the adjacent cells having development lines different from each other.

6. A safety helmet comprising:
an outer cap;
a composite geometry structure housed in said cap and configured to absorb and dissipate the energy generated by an impact,
wherein said composite structure is obtained according to claim 1.

7. The safety helmet according to claim 6, further comprising at least one closing unit constrained to said cap.

8. The safety helmet according to claim 7, wherein in said at least one closing unit there is:
one or more impact absorption elements configured to be foldable;
one or more hook and loop elements coupled to each other and integral with said impact absorption elements.

9. The safety helmet according to claim 8, wherein said one or more impact absorption elements is made of poron.

10. The composite geometry structure according to claim 1, wherein the plurality of arc elements are integrally formed as a single unitary structure with the outer structure.

11. The composite geometry structure according to claim 1, wherein each of the plurality of sidewalls comprises a side face that faces and encircles the corresponding one of the plurality of hollow cells and that extends between the outside perimeter edge and the opposing inside perimeter edge, the opposing ends of each of the plurality of arc elements projecting from spaced apart areas of the inside perimeter edge of the corresponding one of the plurality of sidewalls.

12. The composite geometry structure according to claim 1, wherein the plurality of arc elements are more elastic than the outer structure.

13. The composite geometry structure according to claim 1, wherein each of the plurality of arc elements freely span across the hollow cell of the corresponding sidewall.

14. The composite geometry structure according to claim 1, wherein the outer structure has an outer surface that is convex and an inner surface that is concave, each of the plurality of hollow cells extending between the outer surface and the inner surface.

15. The composite geometry structure according to claim 11, wherein each of the plurality of hollow cells is hollow.

16. The composite geometry structure according to claim 1, wherein each of the plurality of arc elements has an arched interior surface and an arched exterior surface that both span across the hollow cell of the corresponding one of the plurality of sidewalls.

17. The composite geometry structure according to claim 16, wherein the arched interior surface and arched exterior surface of each of the plurality of arc elements are spaced apart from the plurality of hollow cells and are disposed on a same side of the outer structure.

18. The composite geometry structure according to claim 1, wherein each of the plurality of arc elements directly connect with an adjacent one of the plurality of arc elements.

* * * * *